(12) United States Patent
Suenaga et al.

(10) Patent No.: US 7,095,605 B2
(45) Date of Patent: Aug. 22, 2006

(54) SOLID ELECTROLYTIC CAPACITOR

(75) Inventors: Kazuhiro Suenaga, Saga (JP); Kazumasa Fujimoto, Saga (JP); Tetsuyuki Sakuda, Imari (JP)

(73) Assignees: Sanyo Electric Co., Ltd., Moriguchi (JP); Saga Sanyo Industries Co., Ltd., Kishima-gun (JP)

( * ) Notice: Subject to any disclaimer, the term of this patent is extended or adjusted under 35 U.S.C. 154(b) by 0 days.

(21) Appl. No.: 10/506,249

(22) PCT Filed: Mar. 13, 2003

(86) PCT No.: PCT/JP03/03032

§ 371 (c)(1),
(2), (4) Date: Sep. 9, 2004

(87) PCT Pub. No.: WO03/077268

PCT Pub. Date: Sep. 18, 2003

(65) Prior Publication Data

US 2005/0117278 A1    Jun. 2, 2005

(30) Foreign Application Priority Data

Mar. 14, 2002    (JP)    ............................... 2002-069740

(51) Int. Cl.
*H01G 9/00*    (2006.01)
(52) U.S. Cl. .................. 361/523; 361/502; 361/512; 361/525; 361/528; 361/529; 29/25.03
(58) Field of Classification Search ................ 361/323, 361/325, 528, 529–532, 508, 523–525; 29/25.03
See application file for complete search history.

(56) References Cited

U.S. PATENT DOCUMENTS

| | | | | |
|---|---|---|---|---|
| 5,638,253 | A | * | 6/1997 | Hasegawa .................... 361/535 |
| 6,052,273 | A | * | 4/2000 | Inoue et al. ................. 361/523 |
| 6,515,847 | B1 | * | 2/2003 | Naraya ....................... 361/523 |

FOREIGN PATENT DOCUMENTS

| | | |
|---|---|---|
| JP | 1-150315 | 6/1989 |
| JP | 2-151012 | 6/1990 |
| JP | 9-148189 | 6/1997 |
| JP | 2000-21682 | 1/2000 |

* cited by examiner

*Primary Examiner*—Nguyen T. Ha
(74) *Attorney, Agent, or Firm*—Armstrong, Kratz, Quintos, Hanson & Brooks, LLP

(57) ABSTRACT

A solid electrolytic capacitor includes a capacitor element and an outer shell, made of an insulating resin, that covers the capacitor element. The capacitor element has a winding portion that is formed by rolling an anode foil with a dielectric oxidized film formed on its surface, a cathode foil, and a separator that is sandwiched between the anode foil and the cathode foil, and a conductive polymer layer is formed between the anode foil and the cathode foil. An anode lead wire electrically connected to the anode foil, and a cathode lead wire electrically connected to the cathode foil extend from the winding portion, penetrate the outer shell, and are respectively connected to an anode electrode terminal and a cathode electrode terminal that are arranged on a surface of the outer shell.

11 Claims, 4 Drawing Sheets

PRIOR ART

SOLID ELECTROLYTIC CAPACITOR

BACKGROUND OF THE INVENTION

1. Field of the Invention

This invention relates to a solid electrolytic capacitor with a conductive polymer layer as solid electrolytic layer.

2. Description of the Related Art

Solid electrolytic capacitors that utilize a solid electrolytic layer are widely used in electronic devices because, in addition to their small size and large storage capacity, their equivalent series resistance is small. Especially, solid electrolytic capacitors that utilize a conductive polymer layer as the solid electrolytic layer have low equivalent series resistance compared to the ones that utilize manganese dioxide or TCNQ complex as the solid electrolytic layer, and their production is increasing in recent years.

Solid electrolytic capacitors are usually formed by accommodating a capacitor element inside an exterior case for protection, and the shape of the exterior case is formed to be suitable for mounting onto a circuit board. FIG. 7 is a schematic diagram of a capacitor element (1) of winding type that has been conventionally used. The winding-type capacitor element (1) has a winding portion (2) that is formed by rolling a band-shaped anode foil (21), a band-shaped cathode foil (22), and a band-shaped electrically insulating separator (23) that is sandwiched between the anode foil and the cathode foil. For the anode foil (21), a foil of valve metal such as aluminum, tantalum, niobium, or titanium is used. The surface of the anode foil (21) is etched and a dielectric oxidized film is formed. For the cathode foil (22), too, the foil of the valve metal is usually used. A binding tape (24) is pasted on the lateral side of the winding portion (2) to prevent the winding portion from collapsing. Tab terminals (31) and (32), made of aluminum, are respectively connected to the anode foil (21) and the cathode foil (22). An anode lead wire (41) is electrically connected to the anode foil (21) and a cathode lead wire (42) is electrically connected to the cathode foil (22) through the tab terminals (31) and (32).

FIG. 8 is a cross-sectional view of a vertical chip-type solid electrolytic capacitor that uses the capacitor element (1) described above. In this view, the cross section of the capacitor element (1) is simplified. In the capacitor element (1), the solid electrolytic layer is formed between the anode foil (21) and the cathode foil (22), and the capacitor element (1) is then accommodated in a metal cylindrical container (11). The metal container (11) is made of aluminum, for example. A seal rubber (12) is arranged so as to close the opening of the metal container (11). The seal rubber (12) is made of butyl rubber, for example. It is ensured that the opening is sealed and the seal rubber (12) is securely fastened by clamping the side wall of the metal container (11) and bending the tip of the metal container (11) inward, forming as a curled portion (13).

A lid-shaped floor board (14) is fastened on one end of the metal container (11). The floor board (14) is made of an insulating plastic, for example. The anode lead wire (41) and the cathode lead wire (42) both penetrate the seal rubber (12) and the floor board (14). In the places where these lead wires (41) and (42) protrude from the floor board (14), they are plastically formed to respectively make an anode electrode terminal (61) and a cathode electrode terminal (62). The electrodes (61) and (62) have a flat plate shape and are disposed on the surface of the floor board (14).

Solid electrolytic capacitors are used in various electronic devices and are installed on the circuit boards of these electronic devices. For the electronic devices that are steadily becoming smaller and thinner such as notebook PCs and mobile information terminals (PDA), there is a need for denser and thinner circuit boards, and accordingly, there is also a need for smaller and thinner solid electrolytic capacitors. Therefore, to fulfill this need, it is conceivable to make the thickness of the seal rubber (12) and the floor board (14) of the conventional solid electrolytic capacitor smaller. It should be noted that it is difficult to make the size of the capacitor element (1) itself smaller. Because the shape of the capacitor element (1) is directly related to the electrical properties of the solid electrolytic capacitor, it is difficult to change the shape while still keeping predetermined electrical properties.

However, for the above-described solid electrolytic capacitor, the seal rubber (12) needs to have a thickness of a certain value or more to prevent the moisture of the atmosphere from reaching the capacitor element (1). The floor board (14) too needs to have a thickness of a certain value or more to obtain a desired durability to withstand an impact. Therefore, there is a limit in trying to make the solid electrolytic capacitor smaller and thinner by reducing the thickness of the seal rubber (12) and the floor board (14). In addition, the curled portion (13) must be formed in the metal container (11) to fasten the seal rubber (12) in the metal container (11). The height of the solid electrolytic capacitor increases by the height of the curled portion (13).

As the lengths of the lead wires (41) and (42) from the winding portion (2) to the electrode terminals (61) and (62) become shorter, the equivalent series resistance of the solid electrolytic capacitor becomes smaller. It is however not possible to shorten the lead wires (41) and (42) to lower the equivalent series resistance, because the seal rubber (12) and the floor board (14) need to have at least a certain thickness. It is desirable to minimize the contribution that these lead wires (41) and (42) have on the equivalent series resistance, because the advantage of the solid electrolytic capacitor is small equivalent series resistance.

The present invention was made in order to solve these problems and to provide a smaller and thinner solid electrolytic capacitor in which the contribution on the equivalent serial resistance by the lead wires is small.

SUMMARY OF THE INVENTION

The solid electrolytic capacitor of the present invention comprises a capacitor element and an outer shell that is made of an insulating resin and that covers the capacitor element, wherein the capacitor element comprises a winding portion that is formed by rolling together an anode foil with a dielectric oxidized film formed on its surface, a cathode foil, and a separator that is sandwiched between the anode foil and the cathode foil; a conductive polymer layer is formed between the anode foil and the cathode foil; and an anode lead wire electrically connected to the anode foil, and a cathode lead wire electrically connected to a cathode foil extend from the winding portion, penetrate the outer shell, and are respectively connected to an anode terminal and the cathode terminal that are arranged on a surface of the outer shell.

Furthermore, the solid electrolytic capacitor of the present invention, in addition to the configuration described above, may have a metal layer that covers the winding portion without electrically connecting the anode lead wire and the cathode lead wire or a coating layer that is made of a water repelling resin, such as flouroresin and silicon resin, that covers the winding portion.

Furthermore, in the solid electrolytic capacitor of the present invention, auxiliary junctions made of metal that are fastened to the circuit board may be provided on the surface of the outer shell where the anode electrode terminal board and the cathode electrode terminal board are arranged.

By covering the winding portion with an outer shell which is made of resin, the seal rubber, the curled portion, and the floor board that were used in the conventional solid electrolytic capacitor become unnecessary. Since the thickness of these do not add to the thickness of resin, the thickness of the solid electrolytic capacitor on the side where the anode lead wire and the cathode lead wire are arranged can be made thinner. Furthermore, because the length of the lead wire shortens, the contribution that the lead wires make to the equivalent serial resistance becomes smaller.

By covering the winding portion with the coating layer that is made of metal or water repelling resin, the amount of moisture that penetrates the outer shell and reaches the winding portion is dramatically reduced and the change of the capacitor properties due to moisture can be made very small.

The solid electrolytic capacitor can be fastened more firmly to the circuit board by providing the auxiliary junctions, in addition to the anode electrode terminal and the cathode electrode terminal, on the surface of the outer shell, and by joining the auxiliary junctions as well as these terminals to the circuit board by soldering, for example, in the electronic equipments mounted in automobile, for which vibration resistance is desired.

DETAILED DESCRIPTION OF AN EXEMPLARY EMBODIMENT OF THE PRESENT INVENTION

Below, a working example of the present invention is explained with reference to the drawings. Structural elements that are the same or similar to the conventional solid electrolytic capacitor are shown with the same symbols.

Figure 1:
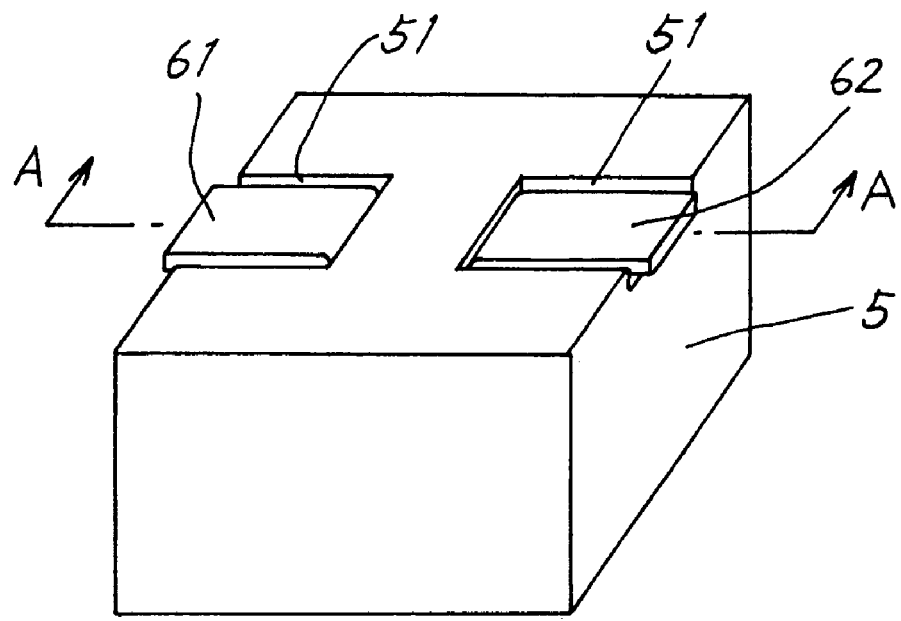
FIG. 1 is a perspective view of a first working example of a solid electrolytic capacitor according to the present invention.
Figure 2:
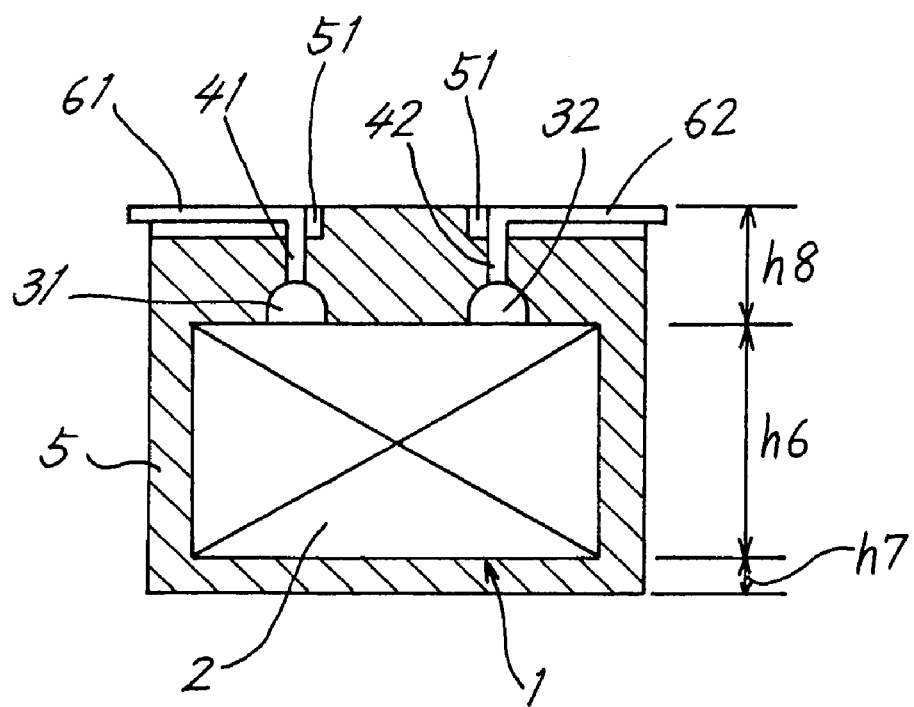
FIG. 2 is a cross-sectional view of the first working example of the solid electrolytic capacitor according to the present invention, cut along a perpendicular plane that includes the A–A' line in FIG. 1.

FIG. 1 is a perspective view showing a first working example of a solid electrolytic capacitor according to the present invention. FIG. 2 is a cross-sectional view of the capacitor. A capacitor element (1) is covered by an outer shell (5), which is made of an insulating resin. For the insulating resin, epoxy resin, for example, is used. The shape of the outer shell (5) is substantially that of a rectangular solid, and an anode electrode terminal (61) and a cathode electrode terminal (62) are placed in indentations (51) and (51) that are formed on one surface of the outer shell (5). The electrode terminals (61) and (62) are not directly placed on the flat surface of the outer shell (5), but by placing these electrode terminals (61) and (62) in the indentations (51) and (51), the height of the solid electrolytic capacitor is further reduced. An anode lead wire (41) and a cathode lead wire (42) extend from the capacitor element (1) straight to the surface of the outer shell (5) where the indentations (51) and (51) are formed. These lead wires (41) and (42) penetrate the outer shell (5) and reach a bottom face of the indentations (51) and (51), and respectively connect to the anode electrode terminal (61) and the cathode electrode terminal (62).

Figure 7:
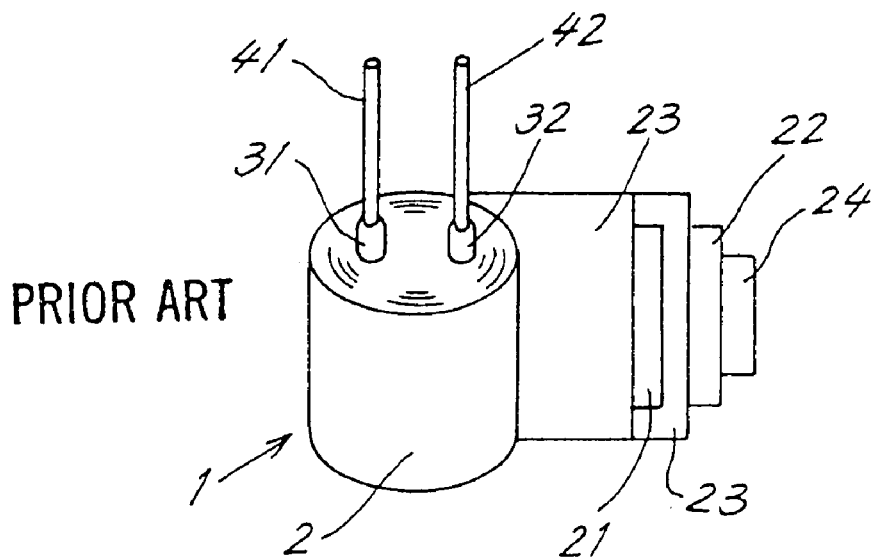
FIG. 7 is a schematic diagram of a capacitor element.

The solid electrolytic capacitor according to the present invention is fabricated as follows. First, the capacitor element (1) as shown in FIG. 7 is fabricated. The configuration of the capacitor element (1) is as explained above. Moreover, because an anode foil (21) is made by oxidizing a valve metal (in this working example aluminum) of large surface area and cutting it into bands, a dielectric oxidized film is not formed on the cutting surface. Therefore, as shown in FIG. 7, a dielectric oxidized film on the cutting surface of the anode foil (21) is then formed after a winding structure of the capacitor element (1) is made. Then, after thermally treating the capacitor element (1) at 280° C., it is immersed in a mixed solution of 3,4-ethylenedioxythiophene and iron(III) tris(p-toluenesulfonate) including n-butyl alcohol as diluting agent to form a dielectric polymer layer between the anode foil (21) and the cathode foil (22) through chemical polymerization. In this working example, the conductive polymer layer is made of polythiophene functional polymer, but polypyrrole or polyaniline functional polymer can also be used as the functional polymer.

Next, as shown in FIG. 7, when the anode lead wire (41) and the cathode lead wire (42) stand erect on tab terminals (31) and (32) of the capacitor element (1), flat anode electrode terminal (61) and cathode electrode terminal (62) are formed by press working from their tips to substantially a vicinity of their center of the lead wires (41) and (42). Then, the outer shell (5), made of epoxy resin, is found by injection molding such that it covers the capacitor element (1). Before forming the outer shell (5), it is preferable that a stripping agent is applied to the electrode terminals (61) and (62) in order to allow easy removal of the resin that sticks to the electrode terminals (61) and (62) when conducting injection molding. After the outer shell (5) has been formed, the bottom ends of the anode electrode terminal (61) and the cathode electrode terminal (62) are bent, and these terminals (61) and (62) are respectively placed on the indentations that have been formed on the surface of the outer shell (5).

In this working example, the outer shell (5) that covers the capacitor element (1) is made after the anode electrode terminal (61) and the cathode electrode terminal (62) have been formed. It is also possible to form the outer shell (5) first, and then press work the anode lead wire (41) and the cathode lead wire (42) to form the anode electrode terminal (61) and the cathode electrode terminal (62), and subsequently bend these terminals (61) and (62). It is also possible to form an anode electrode terminal (61) and a cathode electrode terminal (62) separate from the anode lead wire (41) and the cathode lead wire (42), and to connect these terminals (61) and (62) to the respective anode lead wire (41) and cathode lead wire (42) by welding.

Figure 3:
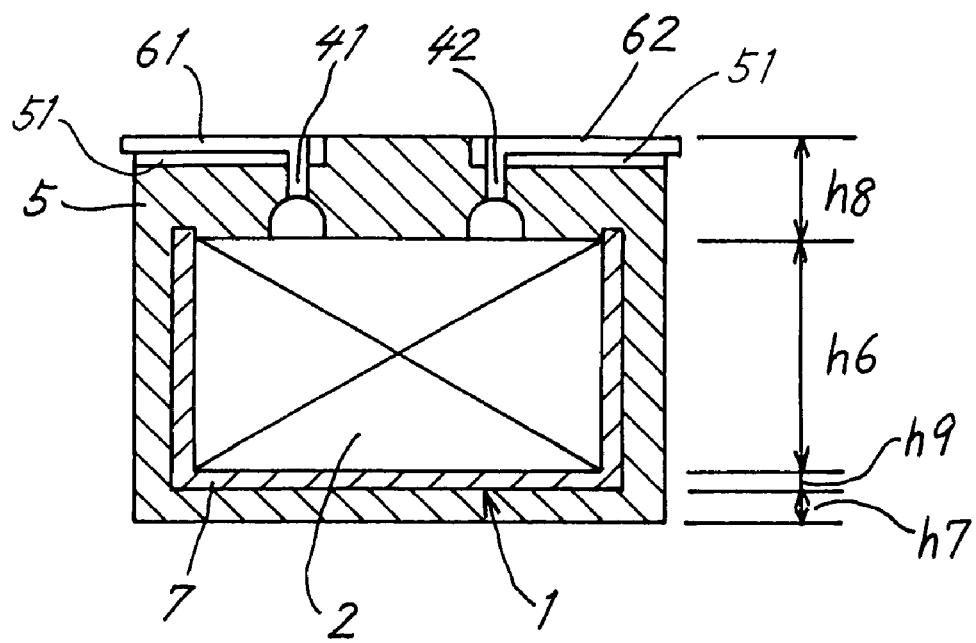
FIG. 3 is a cross-sectional view of a second working example of the solid electrolytic capacitor according to the present invention.
Figure 8:
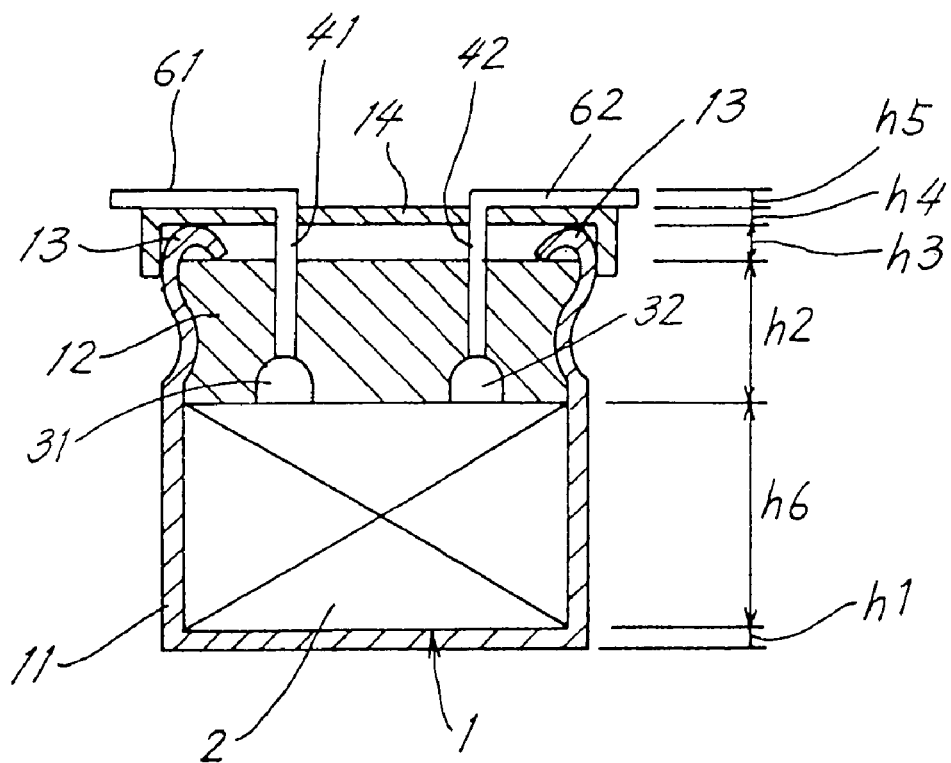
FIG. 8 is a cross-sectional view of a conventional solid electrolytic capacitor.

FIG. 3 is a cross-sectional view of a second working example of the present invention. The solid electrolytic capacitor of this second working example is characterized in that, in addition to the configuration of the first working example, the surface of the winding portion (2) of the capacitor element (1) is covered with a metal layer (7). Furthermore, to avoid the anode lead wire (41) and the cathode lead wire (42) from connecting electrically, or, in other words, to avoid the tab terminals (31) and (32) from coming into physical contact, the metal layer (7) is not formed on the surface where the tab terminals (31) and (32) protrude. In this working example, after forming the conductive polymer layer on the surface of the capacitor element (1), the capacitor element (1) is then accommodated in a cylindrical container so that the aluminum metal layer (7) surrounds the capacitor element (1). The thickness of the container is about the same as that of the metal container (11) shown in FIG. 8. The height is about the same as the height of winding portion (2) of the capacitor element (1) (in other words, the width of the separator (23)).

Another way to form the metal layer (7), for example, is by applying a metal paste on the surface of the capacitor element (1), or by adhering a metal foil on the surface of the capacitor element (1).

It is also possible to form the metal layer (7) only on either the lateral face of the winding portion (2) of the capacitor element (1) or on the face opposite to the face where the tab terminals (31) and (32) protrude. The metal layer (7) can be formed on the face where the tab terminals (31) and (32) protrude, but, in this case, the metal layer (7) and the tab terminals (31) and (32) need to be electrically insulated.

Figure 4:
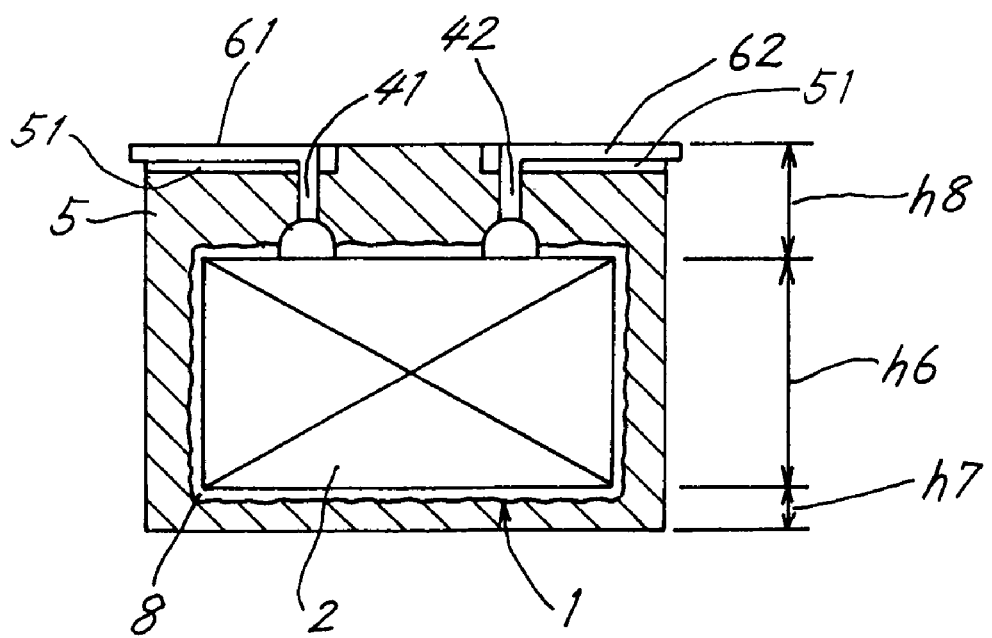
FIG. 4 is a cross-sectional view of a third working example of the solid electrolytic capacitor according to the present invention.

FIG. 4 is a cross-sectional view of a third working example of the present invention. The solid electrolytic capacitor of this third working example is characterized in that, in addition to the configuration of the first working example, the winding portion (2) of the capacitor element (1) is covered by a resin coating layer (8). The thin resin coating layer (8) is formed on the surface of the winding portion (2) by applying a fluororesin by spraying. The resin coating layer (8) is formed to prevent moisture from entering the capacitor element (1). It is therefore preferable to use a water-repelling resins such as fluororesin or silicon resin for the resin coating layer (8).

Figure 5:
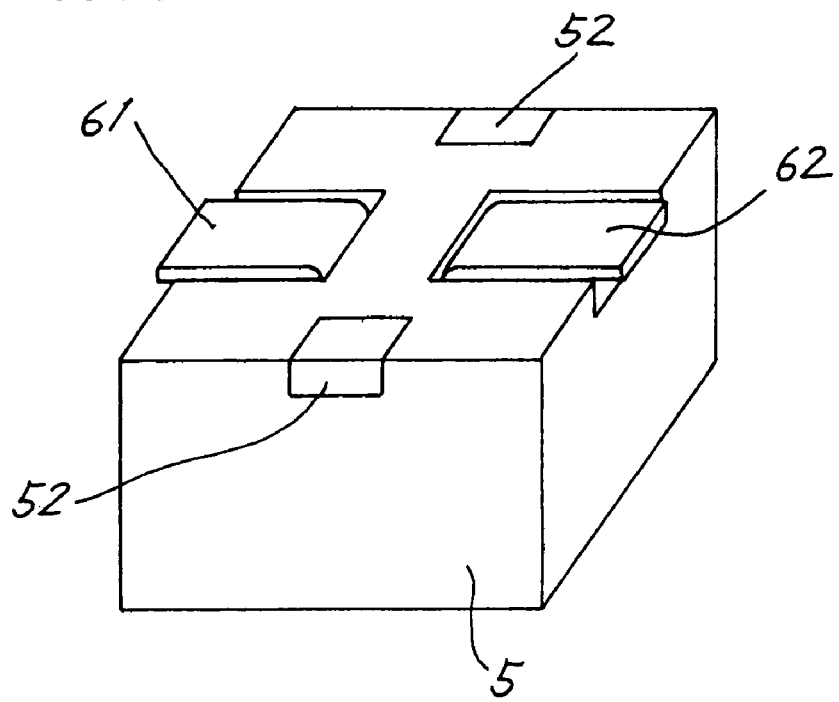
FIG. 5 is a perspective view of a solid electrolytic capacitor according to the present invention that has auxiliary junctions.

FIG. 5 is a perspective view of a solid electrolytic capacitor of the present invention in which the configuration of the first to the third working examples described above is provided with two plate-shaped auxiliary junctions (52) and (52) are embedded in the outer shell (5). The auxiliary junctions (52) and (52) are plates of a metal such as copper that can be soldered or plastic plates whose its surface is covered by such a metal and are embedded in the surface of the outer shell (5) where the anode electrode terminal (61) and the cathode electrode terminal (62) are placed. These auxiliary junctions (52) and (52) are connected by soldering to junctions on the circuit board that are made of metal that can be soldered, when the solid electrolytic capacitor is mounted on the circuit board. The solid electrolytic capacitor of this working example is therefore connected to the circuit board by soldering in 4 places. The auxiliary junctions (52) and (52) may also be formed by applying the metal paste to the surface of the outer shell (5).

Figure 6:
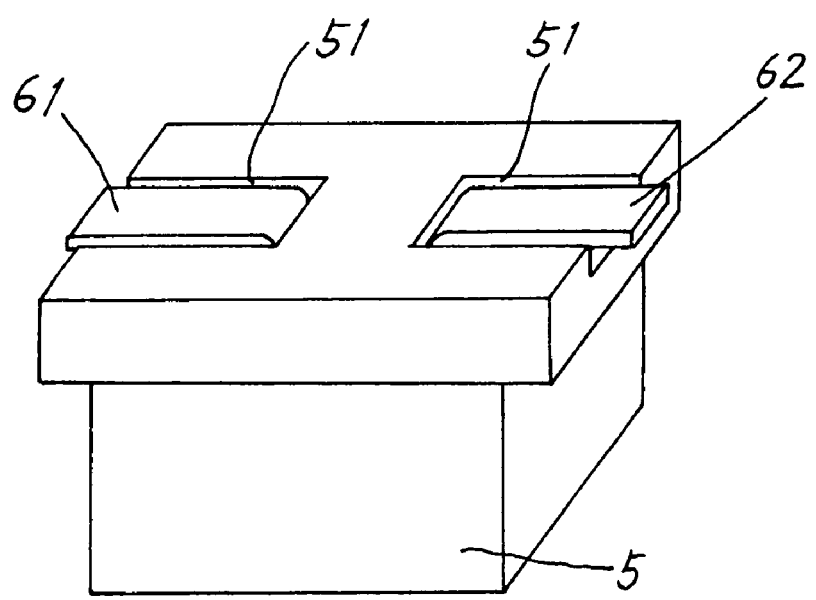
FIG. 6 is a perspective view of the solid electrolytic capacitor according to the present invention that has an outer shell with a two level structure.

FIG. 6 is a perspective view of a solid electrolytic capacitor of the present invention in which the outer shell (5) in the configuration of the first to the third working examples described above has a two level structure. In the working example shown in the FIG. 6, the outer shell (5) is of two level shape, that is, two rectangular solids of different size are placed on top of one another. The sides of the rectangular solid where the anode electrode terminal (61) and the cathode electrode terminal (62) are placed is wider, thus increasing the horizontal cross-sectional area of the outer shell (5). By arranging the outer shell (5) like this, the surface area of the auxiliary junctions (52) and (52) and the electrode terminal plates (61) and (62) that are joined to the circuit board can be increased. The solid electrolytic capacitor can thus be fastened more securely to the circuit board.

Below, working examples of the solid electrolytic capacitor of the present invention are explained more specifically. A conventional solid electrolytic capacitor as well as solid electrolytic capacitors according to the first and the third working example described above was made and the result of a performance test is shown in the table below. All of the solid electrolytic capacitor made had a rated voltage of 4V and a static capacitance of 150 µF. The diameter of the capacitor element (1) is 6.3 mm. Furthermore, the thicknesses (h1 to h9) of the structural elements of the solid electrolytic capacitor that are listed in the leftmost column of the table below are as shown in the FIGS. 2 to 4, and 8.

| | | Conventional example | First working example | Second working example | Third working example |
|---|---|---|---|---|---|
| h1: | thickness of aluminum | 0.3 mm | — | — | — |
| h2: | thickness of seal rubber | 1.7 mm | — | — | — |
| h3: | height of curl | 0.3 mm | — | — | — |
| h4: | thickness of floor board | 0.4 mm | — | — | — |
| h5: | thickness of electrode terminal | 0.2 mm | — | — | — |
| h6: | height of winding portion | 2.7 mm | 2.7 mm | 2.7 mm | 2.7 mm |
| h7: | thickness of outer shell resin | — | 0.5 mm | 0.2 mm | 0.5 mm |
| h8: | thickness of outer shell resin (side with lead wires) | — | 0.5 mm | 0.5 mm | 0.5 mm |
| h9: | thickness of metal layer | — | — | 0.3 mm | — |
| | height of the capacitor | 5.6 mm | 3.7 mm | 3.7 mm | 3.7 mm |
| | rate of change of static capacitance after the humidity test | +0.5% | +10% | +2% | +2% |

As the table shows, the height of the solid electrolytic capacitor is 5.7 mm for the conventional capacitor, but only 3.7 mm in the working examples of the present invention. In other words, by using the present invention, the height of the solid capacitor becomes 30% or more thinner than conventionally. Since the thickness of the resin coating layer (8) is much thinner than the thickness of the structural elements listed in the table, it is ignored when measuring the height of the solid electrolytic capacitor of the third working example.

The moisture resistance characteristics were tested by subjecting the solid electrolytic capacitors of the conventional form as well as those of the working examples to an atmosphere of 60° C. and 90% humidity for 1000 hours. The rate of change of the static capacitance before and after the test was determined. As the table shows, the static capacitance of the solid electrolytic capacitor of the first working example increased by 10% after the test as the moisture penetrates the outer shell (5) and reaches the capacitor element (1). On the other hand, in the solid electrolytic capacitors of the second and the third working example, because there is aluminum metal layer (7) or fluororesin coating (8) between the capacitor element (1) and the outer shell (5), the rate of change of the static capacitance attains a value (+2%) that is hardly inferior to that of the conventional capacitor (+0.5%).

The explanation of the above mentioned working examples is merely an illustration of the present invention, and is not meant to limit the invention as described in the claims, or to reduce the scope of the claims. In addition, the configuration of the various parts of the present invention is not limited to the above-described working example, and various modifications are, of course, possible within the technological scope described in the claims.

INDUSTRIAL APPLICABILITY

Because the capacitor element is surrounded by the outer shell made of insulating resin, the solid electrolytic capacitor of the present invention is small and thin. The contribution of the lead wires to the equivalent serial resistance is also small. Furthermore, because the coating, made of metal layer or water-repelling resin, surrounds the winding portion of the capacitor element, it decreases the moisture that penetrates the outer shell and seeps into the winding portion.

The invention claimed is:

1. A solid electrolytic capacitor comprising:
   a capacitor element; and
   an outer shell that is made of an insulating resin by molding such that the outer shell covers the capacitor element,
   wherein the capacitor element comprises a winding portion that is formed by rolling together an anode foil with a dielectric oxidized film formed on its surface, a cathode foil, and a separator that is sandwiched between the anode foil and the cathode foil;
   wherein a conductive polymer layer is formed between the anode foil and the cathode foil; and
   wherein an anode lead wire electrically connected to the anode foil, and a cathode lead wire electrically connected to a cathode foil extend from the winding portion, penetrate the outer shell, and are respectively connected to an anode terminal and a cathode terminal that are placed in indentations that are formed on a surface of the outer shell.

2. The solid electrolytic capacitor according to claim 1, comprising a metal layer that covers the winding portion without electrically connecting the anode lead wire and the cathode lead wire.

3. The solid electrolytic capacitor according to claim 1, wherein the winding portion is covered with a coating layer that is made of a water repelling resin, such as fluororesin or silicon resin.

4. The solid electrolytic capacitor according to claim 1, wherein the outer shell comprises a first rectangular solid and a second rectangular solid provided on top of the first rectangular solid and having a greater width than that of the first rectangular solid, the anode electrode terminal and the cathode electrode terminal being placed on the second rectangular solid.

5. The solid electrolytic capacitor according to claim 1, wherein the conductive polymer layer is made of polythiophene, polypyrrole or polyaniline functional polymer.

6. The solid electrolytic capacitor according to claim 1, wherein the outer shell is made of epoxy resin.

7. A solid electrolytic capacitor comprising:
   a capacitor element; and
   an outer shell made of an insulating resin and which covers the capacitor element,
   wherein the capacitor element comprises a winding portion that is formed by rolling together an anode foil with a dielectric oxidized film formed on its surface, a cathode foil, and a separator that is sandwiched between the anode foil and the cathode foil,
   wherein a conductive polymer layer is formed between the anode foil and the cathode foil,
   wherein an anode lead wire electrically connected to the anode foil, and a cathode lead wire electrically connected to a cathode foil extend from the winding portion, penetrate the outer shell, and are respectively connected to an anode terminal and a cathode terminal that are arranged on a surface of the outer shell, and
   wherein auxiliary junctions made of metal that are fastened to a circuit board are provided on the surface of the outer shell where the anode electrode terminal board and the cathode electrode terminal board are arranged.

8. The solid electrolytic capacitor according to claim 7, comprising a metal layer that covers the winding portion without electrically connecting the anode lead wire and the cathode lead wire.

9. The solid electrolytic capacitor according to claim 7, wherein the winding portion is covered with a coating layer that is made of a water repelling resin, such as fluororesin or silicon resin.

10. The solid electrolytic capacitor according to claim 7, wherein the conductive polymer layer is made of polythiophene, polypyrrole or polyaniline functional polymer.

11. The solid electrolytic capacitor according to claim 7, wherein the outer shell is made of epoxy resin.

* * * * *